United States Patent [19]

Paul

[11] Patent Number: 5,177,954
[45] Date of Patent: Jan. 12, 1993

[54] GAS TURBINE ENGINE WITH COOLED TURBINE BLADES

[76] Inventor: Marius A. Paul, 1100 E. Orangethorpe Ave., Ste. 140, Anaheim, Calif. 92801

[21] Appl. No.: 543,557

[22] Filed: Jun. 26, 1990

Related U.S. Application Data

[60] Division of Ser. No. 348,674, May 8, 1990, Pat. No. 5,003,766, which is a continuation of Ser. No. 924,136, Oct. 27, 1986, abandoned, which is a continuation of Ser. No. 659,328, Oct. 10, 1984, abandoned.

[51] Int. Cl.$^5$ .................................. F02C 7/16
[52] U.S. Cl. .................... 60/39.54; 60/39.75; 60/736; 415/114; 416/96 R
[58] Field of Search ............ 60/39.53, 39.54, 39.58, 60/39.75, 267, 730, 736; 415/114, 115; 416/96 R, 97 R

[56] References Cited

U.S. PATENT DOCUMENTS

| | | | |
|---|---|---|---|
| 2,563,269 | 8/1951 | Price. | |
| 2,575,682 | 11/1951 | Price. | |
| 2,647,368 | 8/1953 | Triebbnigg et al. | 60/39.05 |
| 2,970,807 | 2/1961 | Endres | 253/39.15 |
| 3,446,481 | 5/1969 | Kydd | 253/39.15 |
| 3,446,482 | 5/1969 | Kydd | 253/39.15 |
| 3,553,712 | 10/1970 | Kercher | 416/92 |
| 3,600,890 | 8/1971 | White et al. | |
| 3,658,439 | 4/1972 | Kydd | 416/97 |
| 3,806,275 | 4/1974 | Aspinwall | 416/92 |
| 3,844,679 | 10/1974 | Grondahl et al. | 416/97 |
| 3,856,433 | 12/1974 | Grondahl et al. | 416/97 |
| 4,111,604 | 9/1978 | Kydd | 416/97 |
| 4,118,145 | 10/1978 | Stahl | 416/96 |
| 4,179,240 | 12/1979 | Kothmann | 415/114 |
| 4,190,398 | 2/1980 | Corsmeier et al. | 415/114 |
| 4,242,045 | 12/1980 | Grondahl | 416/92 |
| 4,314,442 | 2/1982 | Rice | 60/39.54 |
| 4,321,010 | 3/1982 | Wilkinson et al. | 416/92 |
| 4,330,235 | 5/1982 | Araki | 416/96 R |
| 4,338,780 | 7/1982 | Sakamoto et al. | 60/39.05 |
| 4,350,473 | 9/1982 | Dakin | 416/96 R |
| 4,845,941 | 7/1989 | Paul | 60/39.06 |
| 4,946,346 | 8/1990 | Ito | 415/115 |
| 4,982,564 | 1/1991 | Hines | 60/39.55 |

FOREIGN PATENT DOCUMENTS

| 1246324 | 8/1967 | Fed. Rep. of Germany. |
| 924012 | 7/1947 | France. |

OTHER PUBLICATIONS

Fundamentals of Gas Turbines, John Wiley & Sons, W. W. Bathie, pp. 252-259.

*Primary Examiner*—Louis J. Casaregola
*Attorney, Agent, or Firm*—Bielen, Peterson & Lampe

[57] ABSTRACT

A gas turbine engine that can operate at a very high efficiency over a wide range of load conditions. In one important feature of the invention, combustion gases are discharged along two paths, one with constant energy and the other with energy that varies in accordance with the engine load. The constant energy discharge drives a turbine that, in turn, operates a compressor for the engine at a constant, high efficiency. Alternatively, the compressor is driven at a speed that varies inversely with the engine load such that the engine operates at a high efficiency for all loads. In another, independent feature of the invention, the combustion occurs at a stoichiometric ratio of fuel and air, with the turbine blades being protected from the vastly increased combustion gas temperatures by an internal array of passageways through which cooling liquid, e.g., liquid fuel, and air are channeled. The fuel and air mix together to form a rich, turbulent pre-mix for ejection directly into the surrounding combustion chamber. This configuration can also be utilized to inject steam into the combustion chamber, to provide a Rankine cycle, with internal cogeneration. In yet another independent aspect of the invention, the compressor that supplies compressed air to the combustion chamber includes two counter-rotating radial impellers, with the second impeller further functioning as a diffuser for the first impeller.

14 Claims, 11 Drawing Sheets

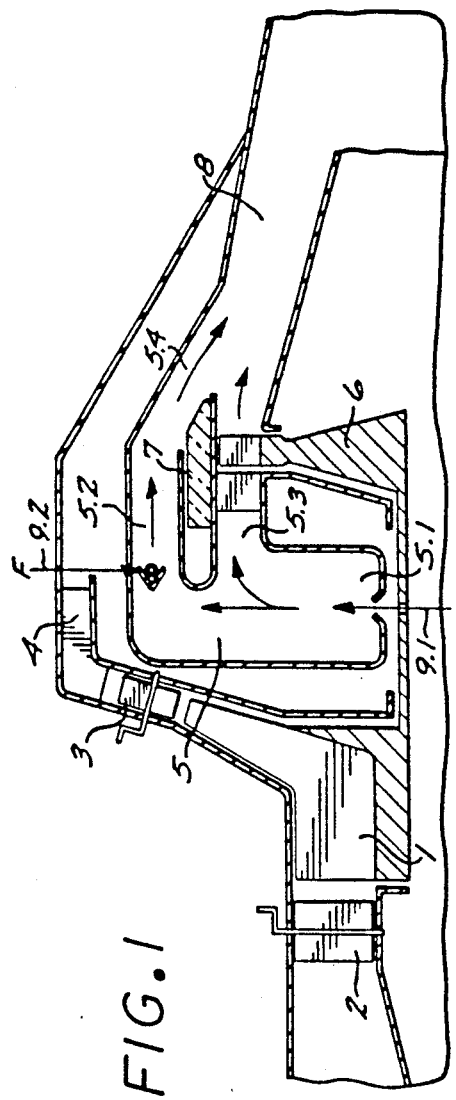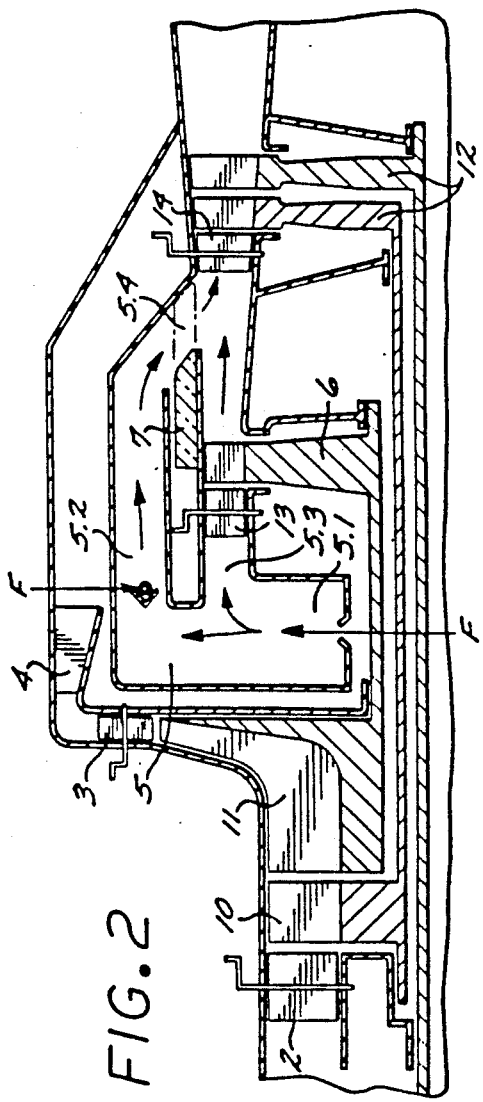

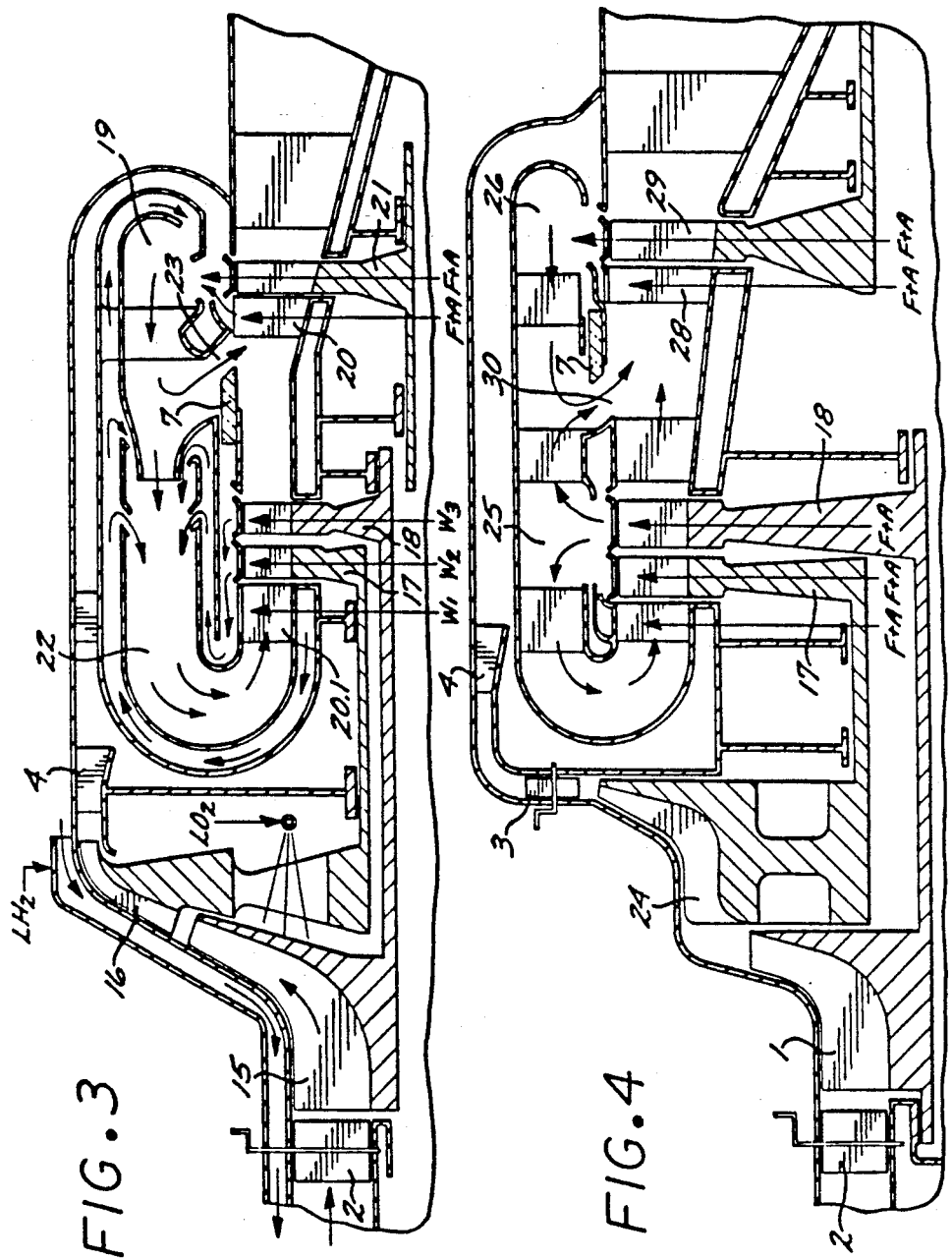

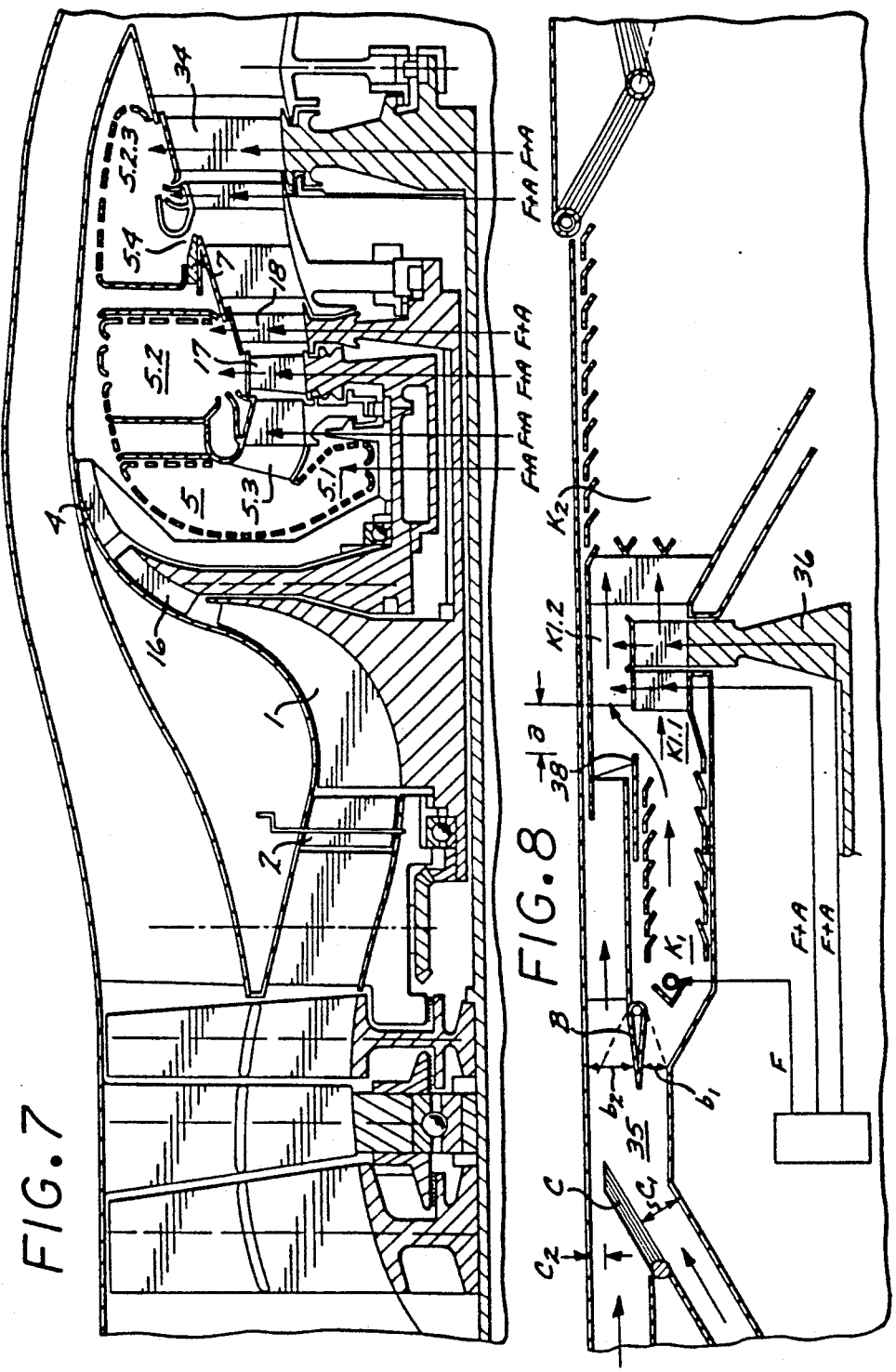

GAS TURBINE ENGINE WITH COOLED TURBINE BLADES

BACKGROUND OF THE INVENTION

This application is a division of application Ser. No. 07/348,674 filed May 8, 1990, and now U.S. Pat. No. 5,003,766, which is a continuation of application Ser. No. 06/924,136 filed Oct. 27, 1986 and now abandoned, which is a continuation of application Ser. No. 659,328, filed Oct. 10, 1984 and now abandoned.

This invention relates generally to gas turbine engines, and, more particularly, to structural improvements that improve the efficiency of such engines.

The superior characteristics of the gas turbine engine for numerous high power applications, both military and commercial, are well known. Low specific weight and fundamental mechanical simplicity particularly favor this type of engine.

Numerous developmental paths are available for reducing the gas turbine engine's fuel and air consumption and for reducing its size and weight. Many of these paths, however, lead to undesired complexity and high cost.

One obstacle in the evolution of the gas turbine engine is the inability to provide a sufficiently high and constant pressure ratio for the compressor without unduly increasing the engine's size and cost. The graph of FIG. 14 shows the effects of the compressor's pressure ratio and efficiency on the engine's specific fuel and air consumption. Although an increase in the pressure ratio at a given efficiency increases the engine's specific power, a more significant effect is the reduction in specific fuel consumption.

The dramatic variation in specific fuel consumption as a function of pressure ratio is, in fact, the major disadvantage of the gas turbine engine and the Brayton cycle it follows. The engine is therefore generally unsuited for applications where power and speed are variable. It has ordinarily been used only in applications where the requirements for power and speed are substantially constant.

Another obstacle in the evolution of gas turbine engines is the limited heat resistance of the engine's fixed vanes and turbine blades. Complete combustion of petroleum fuels at a stoichiometric ratio with air results in a combustion gas temperature near 4000° F. (or 2200° C.). However, the engine components mentioned above cannot ordinarily be heated above about 2300° F. (or 1200° C.), without incurring damage. The usual solution to this overheating problem is to dilute the combustion gases with an excess of compressed air, typically three to four times as much air as is required for stoichiometric combustion with the fuel. This dilution reduces the temperature of the combustion gases below the 2300° F. limit, but unfortunately requires power to compress and deliver the additional air and also significantly increases the engine's size.

An afterburner can be used to fully combust the dilution air mixed in with the combustion gases. This afterburner is located downstream of the engine's turbine, however, such that the pressure of the air delivered to it has been significantly reduced by passage through the turbine, and the afterburner's efficiency is consequently very low. The afterburner is therefore suitable for use in only very limited circumstances, for relatively short time durations, when additional power is required.

The desire to operate at higher combustion gas temperatures is longstand. Improved metallurgy and fabrication techniques have permitted operation at somewhat higher temperatures, but there is still significant room for further improvement. The graph of FIG. 15 shows that increasing the combustion gas temperature at the turbine inlet merely 600° F., from 1700° F. to 2300° F., nearly doubles the power obtained per pound of air flow.

One technique proposed for permitting engine operation at temperatures of about 2300° F. involves cooling the turbine shrouding, stator blades and rotor blades using air diverted from the engine's compressor. As shown in the graph of FIG. 16, this leads to inefficiencies in the thermal cycle, since a portion of the compressed air (probably about eight percent) bypasses the engine's combustion chamber.

It should therefore be appreciated that there is a significant need for a gas turbine engine that avoids the problems identified above. In particular, there is a need for an engine that combusts fuel and air at a stoichiometric ratio and that can operate at maximum efficiency for a wide range of loads. The present invention fulfills these and other needs.

SUMMARY OF THE INVENTION

The present invention is embodied in an improved gas turbine that combusts fuel and air at a stoichiometric ratio and that operates at a uniformly high efficiency over a wide range of loads. The engine is significantly smaller than previous engines of comparable power, and requires significantly reduced amounts of both fuel and air.

The gas turbine engine of the invention includes a combustion chamber, a turbine rotatably driven by the combustion gases discharged from the combustion chamber, and a compressor rotatably driven by the turbine for compressing air and directing it into the combustion chamber. In accordance with the invention, the engine discharges the combustion gases through two channels, a first channel directing the gases through the turbine and a second channel directing the gases along a path that bypasses the turbine. Regulating means regulates the relative proportions of the gases that are discharged through the respective channels. In several embodiments of the invention, this regulation maintains the energy of the gases discharged through the turbine at a substantially constant value, such that the turbine is rotated at a substantially constant angular velocity, regardless of the engine load. This drives the compressor at a correspondingly constant angular velocity, which thereby provides compressed air at a substantially constant pressure and flow rate. The energy of the high-pressure combustion gases discharged through the second channel is controllably variable and completely available to drive the variable engine load.

Fuel injection means injects an amount of fuel into the combustion chamber that varies in accordance with the engine load. Sufficient fuel is injected to combust with the air at a stoichiometric ratio, at least with respect to the portion of the combustion gases discharged through the second channel, which bypasses the turbine. The entire amount of injected fuel can combust at a stoichiometric level, including the portion that produces combustion gases discharged through the first channel, i.e., to the turbine, if the engine further includes means for cooling the hot engine parts exposed to those gases, e.g., by internal cooling with liquid and air.

The regulating means for regulating the discharge of combustion gases through the respective first and second channels includes valve means for controllably adjusting the minimum cross-sectional size of the second channel. In several preferred embodiments, this includes an axially-movable ceramic ring disposed in the second channel, and means for controllably moving the ring axially in the channel.

The combustion gases discharged through the first and second channels preferably rejoin and are mixed together in a common expansion duct. This re-heats the portion of the gases discharged through the first channel, i.e., through the turbine. The engine can further include a second turbine driven by the mixed gases in the common expansion duct, to drive a variable load. Alternatively, the engine can further include a nozzle for discharging the mixed gases and providing jet propulsion. In the latter case, ram means can also be included for directing high pressure air directly to the combustion chamber, bypassing the compressor, whenever the engine velocity, relative to the surrounding air, exceeds a predetermined value.

In one embodiment of the invention, the engine further includes a second combustion chamber, located downstream of the turbine. Second regulating means regulates the relative proportions of compressed air directed into the two combustion chambers, such that the second chamber receives a selected amount of air directly from the compressor as well as combustion gases from the first chamber, via either or both of the first and second channels.

In another embodiment of the invention, the regulating means maintains the maximum temperature of the combustion gases at a substantially constant value for all levels of the variable load. This provides a high thermal efficiency even while driving relatively small loads. In this embodiment, the regulating means includes throttle means for controllably adjusting the flow rate of the compressed air, in direct relationship with the magnitude of the variable load. Valve means are also included for controllably adjusting the relative proportion of combustion gases discharged through the first channel, and thus the turbine, in inverse relationship with the magnitude of the variable load. Thus, at relatively small power levels, the compressor provides a high compression ratio, but low flow rate, whereas at relatively large power levels, the compressor provides a low compression ratio, but high flow rate. The throttle means can include a plurality of vanes in the compressor inlet, and the valve means can include a sliding ring in the path of the discharged combustion gases.

In yet another embodiment of the invention, the gas turbine engine further includes a second combustion chamber operating in parallel with the first combustion chamber. The combustion gases produced in each chamber are utilized to drive separate variable loads. Means are also included for directing selected proportions of the compressed air from the compressor to the respective combustion chambers, in accordance with the relative magnitudes of the two variable loads. In this embodiment, the compressor preferably includes two counter-rotating rotors, with a turbine for the gases from the first combustion chamber driving one rotor, and a turbine for the gases from the second combustion chamber driving the other rotor. Both turbines can operate at controllably-variable speeds, such that the compressor provides a selected pressure ratio.

In a separate, independent aspect of the invention, each turbine blade includes a narrow passageway in its interior, terminating in an outlet port, and injection means injects both cooling liquid and cooling air into the passageway. This produces a turbulent mix of liquid and air in the passageway that enchances the absorption of heat from the blade, permitting operation of the engine at significantly higher combustion gas temperatures.

The combustion chamber is preferably annular and configured to encircle the turbine, with the remote tips of the turbine blades disposed in direct communication with the combustion chamber. The passageway outlet ports are located at the remote tips of the blades, such that the turbulent mix of liquid and air is ejected directly into the combustion chamber. The cooling liquid preferably includes fuel, such that the absorbed heat is recovered in the combustion chamber, and an efficient combustion is achieved due to the turbulent pre-mixing of the fuel and the air.

Each turbine blade preferably includes at least two narrow passageways, with cooling liquid being injected into one and cooling air into the other. A plurality of lateral passageways interconnect the first two, such that the liquid passes from its passageway to the air passageway, where the two mix together. The cooling liquid preferably moves through its passageway substantially under the influence only of centrifugal force, and the air is preferably supplied by the engine compressor.

In one embodiment, suitable for large turbines, each blade includes a core having the passageways formed in it and a thin skin enclosing the core. The core provides substantially all of the blade's structural strength. Each blade preferably includes a number of radially-aligned first passageways, for the injected liquid, and a greater number of radially-aligned second passageways, for the injected air and liquid/air mix. The air passageways surround the liquid passageways, and are ideally in the form of channels in the outer surface of the blade core.

In another embodiment of the turbine blade, suitable for relatively small turbines, each blade includes an inner tube and a surrounding thin skin. The liquid passageway is located in the inner tube and air/mix passageway is located between the tube and the skin. The cooling liquid is sprayed through holes in the tube onto the inwardly-facing surface of the blade skin. The tube and the skin of each blade preferably each include firetree segments for use in securing them to each other and to the turbine disk. In addition, each blade is preferably formed in a process in which two blade halves are welded together, with the inner tube holes being drilled prior to the welding.

In some embodiments of the invention, the cooling liquid further includes water, such that high-speed, superheated steam is ejected into the combustion chamber. This steam dilutes the combustion gases, thus lowering its temperature, and also provides a Rankine cycle by internal cogeneration. The result is a compact structure that simultaneously implements both a Brayton cycle and a Rankine cycle. The engine can further include means for controllably adjusting the relative amounts of liquid fuel and water injected as cooling liquid into the turbine blades. Alternatively, the cooling liquid can include water, only.

The fixed stator vanes located upstream of the turbine blades should likewise include interior cooling passageways, since they are heated by the combustion gases to a similar extent. Since these vanes do not rotate, the centrifugal force is not available and the cooling liquid must be injected into the passageways under pressure.

The amount by which the turbine blades and stator vanes must be cooled depends, of course, on the load imposed on the engine and thus the temperature of the combustion gases. Under full load, a maximum amount of cooling liquid is injected, whereas under relatively small loads, only air is injected.

In another, independent aspect of the invention, the engine's thermal efficiency is enhanced by cooling the compressor and thus the compressed air. In particular, this cooling is achieved by encircling the compressor with a jacket containing a suitable cryogenic fuel, the heated fuel then being injected into the combustion chamber such that the heat is recovered in the thermal process. In addition, liquid oxygen or the like can be sprayed directly onto the compressor blades, to cool the blades and enrich the engine's oxygenation capacity.

The first rotor preferably includes an initial inducer region and a final impeller region, and the second rotor preferably includes an initial diffuser region, an intermediate inducer region, and a final impeller region. An annular channel can be located between the two rotors, such that air delivered from the first rotor whirls in the channel before reaching the second rotor. The two rotors ideally are driven at substantially constant angular velocities over a wide range of engine loads, such that the compressor operates at a constant, high efficiency.

Other aspects and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

While the specification concludes with claims particularly pointing out and distinctly claiming the subject matter of the present invention, the invention will be more fully understood from the following description of the preferred embodiments, which are given by way of example with the accompanying drawings in which:

FIG. 1 is a cross-sectional view of a gas turbine engine embodying the invention and operating as a jet, with a single combustion chamber but two parallel cycles, one in which combustion gases are directed through a turbine and the other in which combustion gases bypass the turbine;

FIG. 2 is a cross-sectional view of a gas turbine engine embodying the invention and having a combustion chamber similar to that of FIG. 1, but driving a free turbine and including a counter-rotating inducer/compressor;

FIG. 3 is a cross-sectional view of a gas turbine engine embodying the invention and further including isothermic compression and internal cogeneration to further provide a Rankine cycle;

FIG. 4 is a cross-sectional view of a gas turbine engine embodying the invention and further including a turbo-compressor having first and second counter-rotating axial-radial impellers, with a pre-whirl channel located between them and with the second impeller also functioning as a counter-rotating diffuser for the first impeller;

FIG. 7 is a cross-sectional view of a gas turbine engine embodying the invention and further including a turbo-fan bypass;

FIG. 8 is a cross-sectional view of a gas turbine engine embodying the invention and further including a second combustion chamber downstream of the turbine and a valve for channeling selected proportions of compressed air to the respective first and second combustion chambers;

DESCRIPTION OF THE PREFERRED EMBODIMENTS

Figures 5, 6:
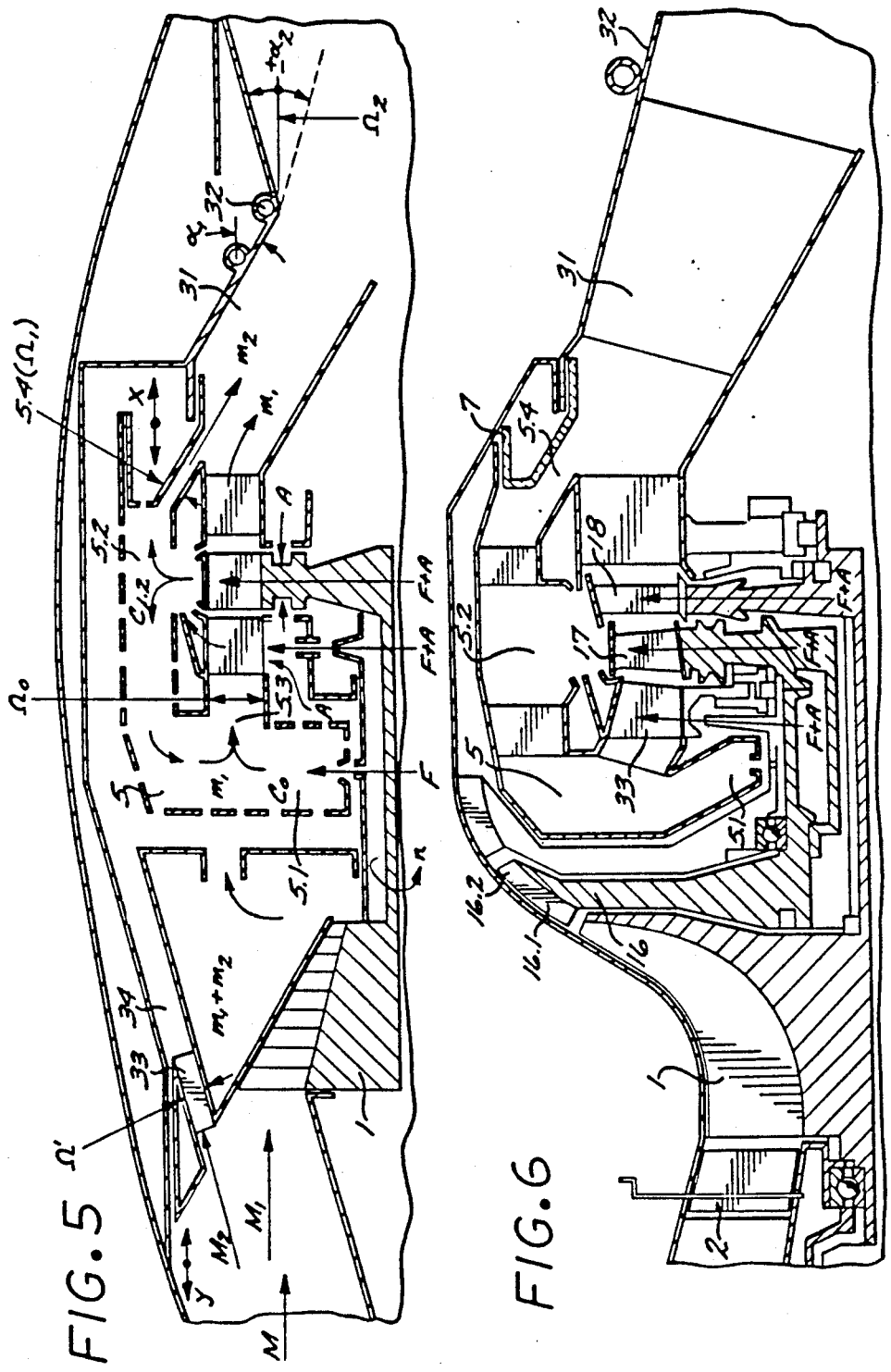
FIG. 5 is a cross-sectional view of a gas turbine engine embodying the invention and further being convertible to operation as a ramjet.
FIG. 6 is a cross-sectional view of a gas turbine engine embodying the invention and further including an alternative configuration for a turbo-compressor having two counter-rotating radial impellers.

With reference now to the drawings, for purposes of illustration, there are shown a number of alternative embodiments of a gas turbine engine embodying the present invention. Although each embodiment has its own unique features, most of them have substantial similarity with each other. In all of the drawings, corresponding elemnts are identified by the same reference numerals.

FIG. 1 depicts one example of a gas turbine engine embodying the present invention, functioning as a turbo-jet. It includes a compressor 1, with axial and radial impellers, an adjustable pre-whirl blade 2, and adjustable diffuser 3 and a fixed diffuser 4. A combustion chamber 5, which includes a primary combustion zone 5.1 and a secondary combustion zone 5.2, receives compressed air from the compressor and burns it with injected fuel. The resulting combustion gases are discharged through a first, constant-energy path 5.3 to a turbine 6, as well as a second, variable-energy path 5.4, which bypasses the turbine. The turbine drives the compressor.

An axially-slidable ring 7 formed of a suitable ceramic material controls the cross-sectional area of the second discharge path 5.4 so as to regulate the energy of the combustion gases discharged through the first path 5.3 to a predetermined, substantially constant value. The gases discharged through the first and second paths join together in a final reaction tube 8, for discharge from the engine. A first fuel supply 9.1 injects fuel for burning in the primary combustion zone 5.1, and a second fuel supply 9.2 injects fuel for burning in the secondary combustion zone 5.2.

Since the sliding ring 7 regulates the energy of the combustion gases discharged through the first path 5.3 and the turbine 6 to a constant value, the turbine and thus the compressor 1 are driven at substantially constant angular velocities, regardless of the magnitude of the engine load. The compressor can thereby be operated at a constant, high efficiency for all engine loads.

FIG. 2 depicts another example of a gas turbine engine embodying the present invention, which drives a turbo-shaft or turbo-fan. The engine is similar to that of FIG. 1, except that it further includes a counter-rotating compressor, with an axial stage 10 and a radial stage 11. The combustion gases discharged along the two paths 5.3 and 5.4 from the combustion chamber 5 drive a free power turbine 12, with counter-rotating rotors. Adjustable guide vanes 13 are provided for the first turbine 6 and adjustable guide vanes 14 are provided for the free power turbine.

Another example of a gas turbine engine embodying the invention is depicted in FIG. 3. It includes a counter-rotating compressor having an internal radial impeller 15 and a concentric external radial impeller 16, driven by counter-rotating turbines 17 and 18, respectively. The external impeller also functions as a diffuser for the internal impeller, transforming the kinetic energy of the air accelerated by the internal impeller into potential energy, or pressure.

The blades of the turbines 17 and 18, as well as fixed vanes 20.1 located upstream of the turbines are cooled by the injection of cooling liquids, preferably water, into narrow, internal passageways formed within them. This heat transfer produces high-speed, superheated steam for ejection into a dilution zone/combustion chamber 22 that encircles the turbines. The steam moves in counterflow along the walls of the chamber and acts like a secondary dilution fluid, to reduce the temperature of the combustion gases to a level compatible with the engine materials. In addition, the engine follows both a Brayton cycle and a Rankine cycle, with an internal cogeneration of steam and combustion gases.

As in the embodiments of FIGS. 1 and 2, the engine of FIG. 3 includes an axially-movable, ceramic ring 7 for use in adjusting the size of a supplementary discharge path 23. The adjustment is made so as to regulate the energy of the combustion gases discharged the turbines 17 and 18 to a substantially constant value. The gases discharged through the two paths join together and then drive a free power turbine 21 connected to a variable load. Liquid fuel and air are supplied to the combustion chamber 19 surrounding the free turbine through narrow passageways located in the blades 21 of the free turbine and in vanes 20 of a fixed stator located upstream of the free turbine. This cools the blades and vanes just like the injected water cools the blades of the turbines 17 and 18.

In another feature of the engine depicted in FIG. 3, the counter-rotating compressor is refrigerated on its outside and inside by cryogenic fluids, preferably a liquid fuel and a special oxidant, respectively. This provides a desirable isothermal compression of the air.

FIG. 4 depicts a turbo-shaft or turbo-fan engine embodying the invention, with a compressor that includes two counter-rotating impellers. The second impeller 24 functions at supersonic speeds simultaneously as a diffuser for the first impeller, an inducer, and a radial impeller. An annular channel is located between the two impellers, and the air accelerated by the first impeller whirls in this channel before reaching the second impeller. In addition, the diffuser portion of the second impeller is oriented generally axially.

The turbine blades and stator vanes of the engine of FIG. 4 are all cooled by the injection of liquid fuel and air into their internal passageways. In particular, the blades of the turbines 17 and 18 deliver premixed and superheated fuel and air to a primary combustion zone 25, and the blades of a stator 28 and a free turbine 29 deliver premixed and superheated fuel and air to a secondary combustion zone 26. The sliding ring 7 controls a variable exit 30, through which the variable-energy combustion gases flow, so as to stabilize the energy of the combustion gases discharged through the turbines 17 and 18.

FIG. 5 depicts a turbo-jet that is convertible into a ramjet, which is another embodiment of the present invention. The engine includes two alternative paths for injecting high pressure air into the combustion chamber 5. One path is through a compressor 1, and the other path 34 bypasses the compressor and is used only when the engine has reached a sufficiently high air speed, in which case dynamic compression can be achieved. A variable-geometry intake vane 33 selectively opens the latter path only when a high air speed has been reached. A common expansion tube 31, controlled by a bidimensional, variable geometry tube 32, directs the combustion gases out of the engine and optimizes the exhaust speed relative to the air speed.

FIG. 6 depicts a gas turbine engine that includes a first radial impeller 1 and a second radial diffuser/impeller 16, driven in counter-rotation by turbines 17 and 18. The second radial diffuser/impeller 16 includes a diffuser section 16.1, for increasing the pressure of the air accelerated by the first impeller 1, and an impeller section 16.2, for further accelerating the air.

FIG. 7 depicts a ducted turbo-fan gas turbine engine that includes a single combustion chamber 5 with several separate zones 5.1, 5.2, 5.2.3 and 5.4. All of the turbines 17, 18 and 34, as well as their associated stators are cooled by an injection of cooling liquid and air into narrow passageways formed within them. The liquid and air are thoroughly mixed and thereafter ejected as high-speed, superheated vapor into the combustion chamber.

Still another example of a gas turbine embodying the present invention is shown in FIG. 8. A compressor (not shown) supplies compressed air 35 for direction along two separate paths by a valve B. The portion directed through a section $b_1$ enters an initial combustion chamber $k_1$, where it is combusted with injected fuel $F_1$. The resulting combustion gases are directed into a constant energy path $k_{1.1}$, to drive a turbine 36, and into a variable-energy path $k_{1.2}$, for entry into a final combustion chamber $k_2$. A cylindrical sliding valve 38 controls the size of the latter path $k_{1.2}$, to stabilize the energy of the gases discharged through the first path $k_{1.1}$, in the manner described earlier.

The final combustion chamber $k_2$ in the engine of FIG. 8 receives compressed air through the section $b_2$, as well as combustion gases through the variable-energy path $k_{1,2}$ and the constant-energy path $k_{1,1}$, via the turbine 36. A premix of fuel and air is supplied to the final combustion chamber via internal passageways in the blades of the turbine and in its corresponding stator vanes. As described earlier, this fuel cools the blades and vanes and reintroduces the heat back into the thermal cycle.

The engine of FIG. 8 further includes an additional valve C for selecting the source of the compressed air 35. At subsonic speeds, the section $c_1$ is open and the compressed air is supplied by the compressor, whereas at supersonic speeds, the section $c_2$ is open and the compressed air is supplied by dynamic compression, as in a ramjet.

Figure 9:
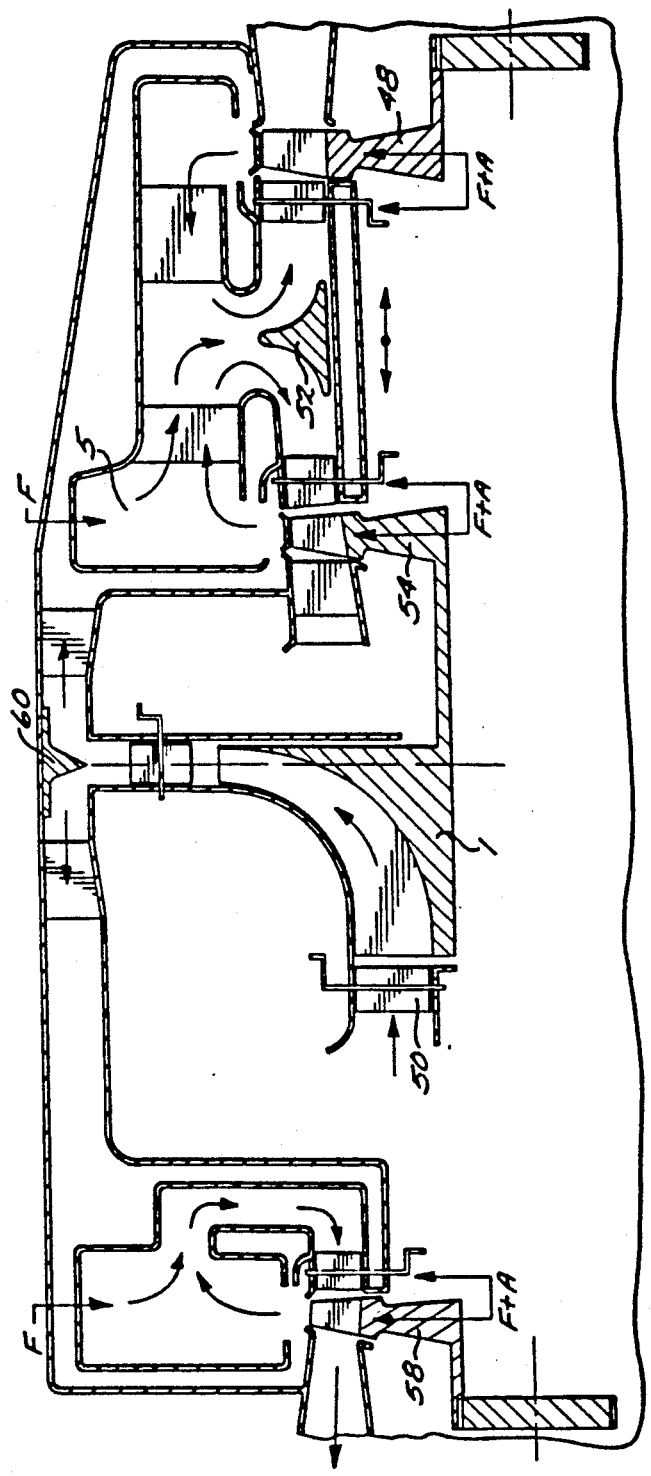
FIG. 9 is a cross-sectional view of a gas turbine engine embodying the invention and including a compressor regulated to provide a pressure ratio that varies inversely with the engine load.

FIG. 9 depicts still another example of a gas turbine engine embodying the present invention. In this embodiment, the compressor 1 is regulated not to provide a constant pressure ratio (as in the previous embodiments), but rather to provide a pressure ratio that varies inversely with a variable engine load, which is driven by a free turbine 48. In particular, the maximum temperature of the combustion gases in the combustion chamber 5 is regulated to be at a substantially constant value for all loads. The engine includes a throttle 50 located in the compressor inlet, for controllably adjusting the compressor flow rate in direct relationship with the load, and a slidable valve 52 located in the combustion chamber discharge path, for controllably adjusting the proportion of the combustion gases channeled through a turbine 54 that drives the compressor, in inverse relationship with the load. Thus, at relatively small loads, the compressor's pressure ratio is high but the flow rate is low, whereas at relatively large loads, the compressor's pressure ratio is low but the flow rate is high.

In another important feature of the engine embodiment of FIG. 9, the engine further includes a second combustion chamber 56 arranged to drive a free turbine 58 connected to a separate variable load. This second combustion chamber receives compressed air from the same compressor 1, and a deflector valve 60 controls the relative proportions of the compressed air directed to the respective combustion chambers 5 and 56, depending on the relative magnitudes of the two variable loads.

Figure 10:
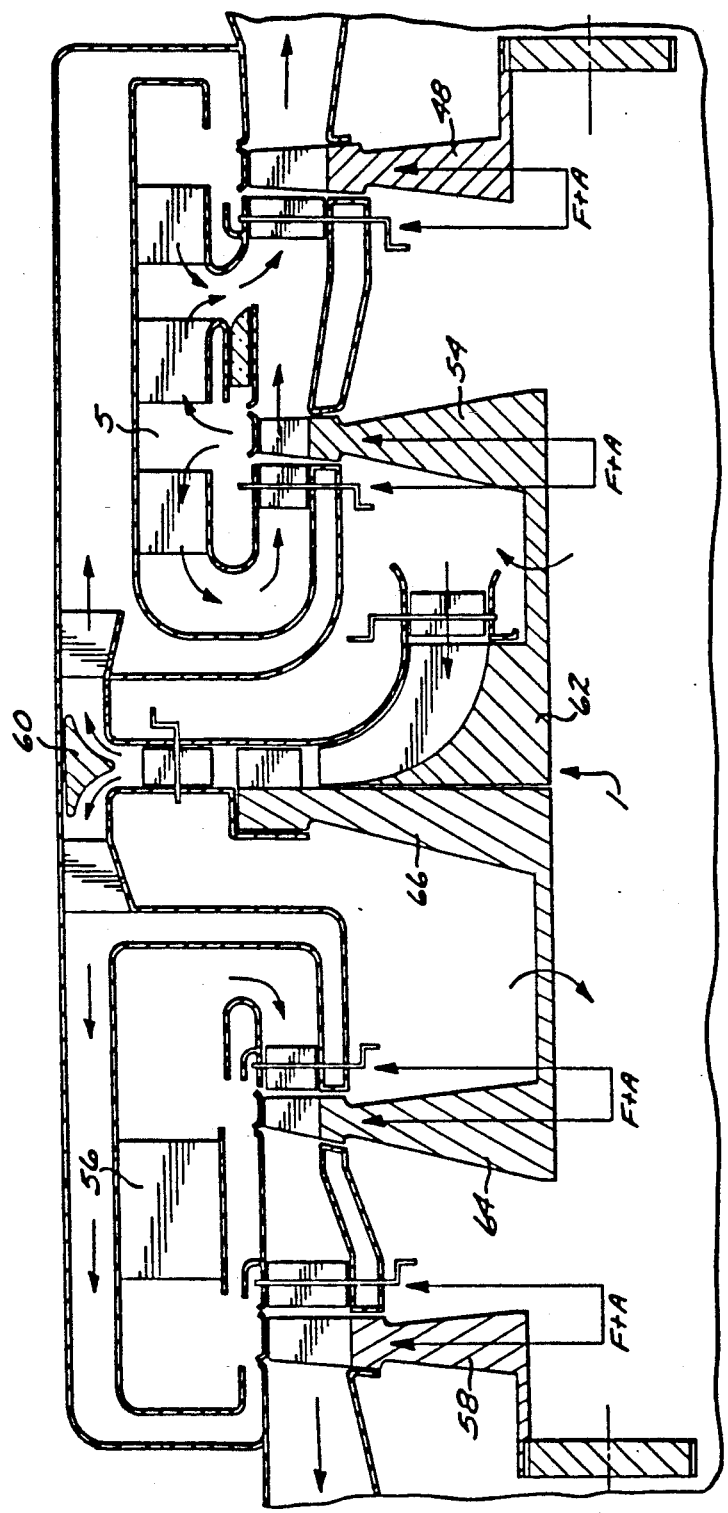
FIG. 10 is a cross-sectional view of a gas turbine engine embodying the invention and including a single compressor supplying air to two separate combustion chambers, each operatively connected to a separate variable load.

FIG. 10 depicts a final example of the invention, this one including a single compressor and two combustion chambers 5 and 56, each arranged to drive a separate variable load. The combustion chamber 5 is associated with a first turbine 54, for driving one rotor 62 of the compressor, and a second turbine 48, for driving one of the variable loads. Similarly, the second combustion chamber 56 is associated with a first turbine 64, for driving another rotor 66 of the compressor, and a second turbine 58, for driving the other variable, load. A deflector valve 60 located at the compressor outlet is controllably movable to adjust the relative proportions of the compressed air directed to the two combustion chambers, in accordance with the magnitudes of the two variable loads.

The two rotors 62 and 66 of the compressor 1 counter-rotate with respect to each other, to increase their relative speed. In addition, as in the compressor of FIG. 9, the rotor speeds can be controllably varied, to provide a higher pressure ratio at relatively small loads, thus improving the engine efficiency at such small loads.

In most of the gas turbine engine embodiments described above, the turbine blades are cooled by injection of both cooling liquid and cooling air into narrow internal passageways formed within them. The liquid, which can include fuel, forms a turbulent pre-mix with the air, which is ejected from ports located at the remote tips of the blades directly into the surrounding combustion chamber. This turbulent pre-mix absorbs significant amounts of heat from the blades, and reintroduces this heat back into the thermal cycle. The internal blade cooling also permits operation of the engine at higher temperatures, even temperatures produced at the stoichiometric ratio of the fuel and air.

Figure 11:
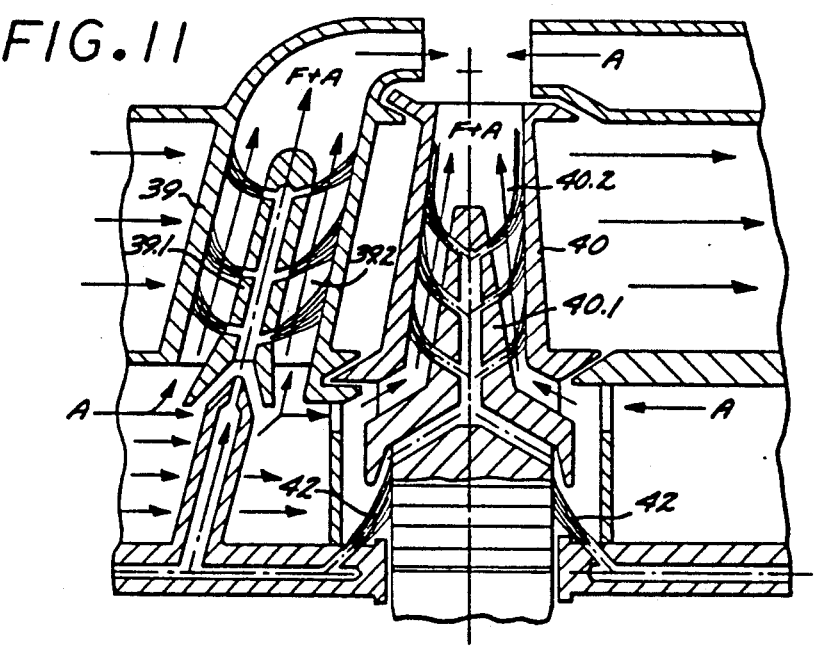
FIG. 11 is a cross-sectional view of one embodiment of a turbine blade and stator blade having internal passageways through which cooling liquid and air are channeled and mixed, to cool the blades.

FIG. 11 is a cross-sectional view of one suitable configuration for the internal passageways for a stator vane 39 and a turbine blade 40. The vane 39 includes a central liquid sprinkler 39.1 surrounded by an air channel 39.2, and the blade 40 similarly includes a central liquid sprinkler 40.1 surrounded by an air channel 40.2. Cooling liquid is sprayed from a plurlity of small holes drilled in the sprinklers onto the inner surface of an encircling metallic skin, to absorb heat supplied by the combustion gases. The liquid and air then mix together to form a rich, turbulent pre-mix for ejection into the surrounding combustion chamber. At low power levels, when the combustion gases are not as hot, only air need be channeled through the blades and vanes. This structure is particularly suitable for use in relatively small engines, where the turbine blade skin, itself, can provide sufficient structural strength.

The stator vanes 39 and turbine blades 40 are each preferably formed of two separate parts, which can be secured to each other by any suitable means, such as electron beam or laser welding. Before such welding, the spray holes are formed in the sprinklers, for example, by drilling.

Figure 12:
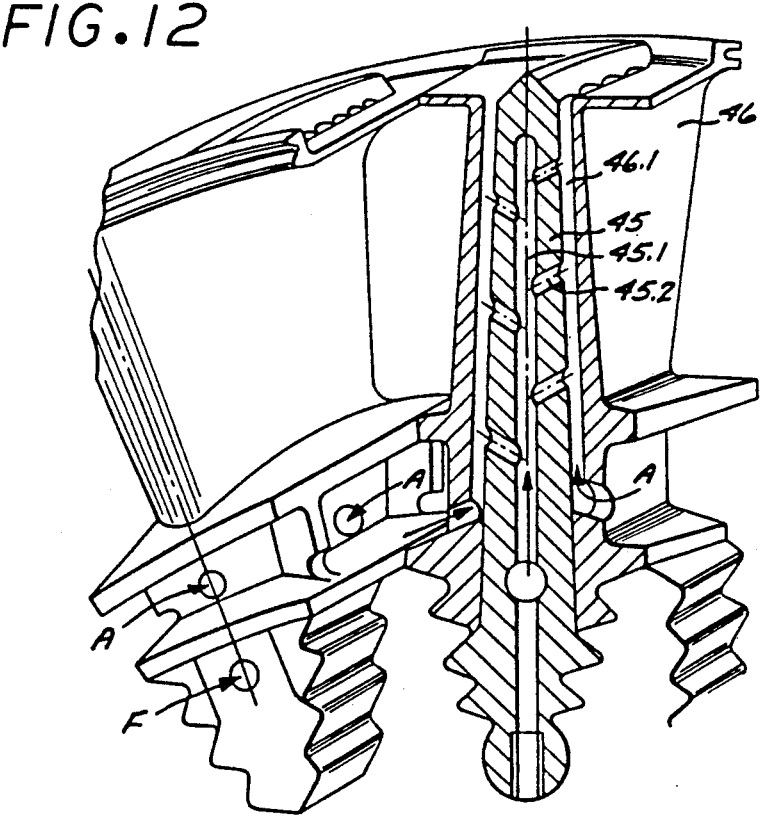
FIG. 12 is a sectional perspective view of another embodiment of a turbine blade having internal passageways through which cooling liquid and air are channeled and mixed, to cool the blade.
Figure 13:
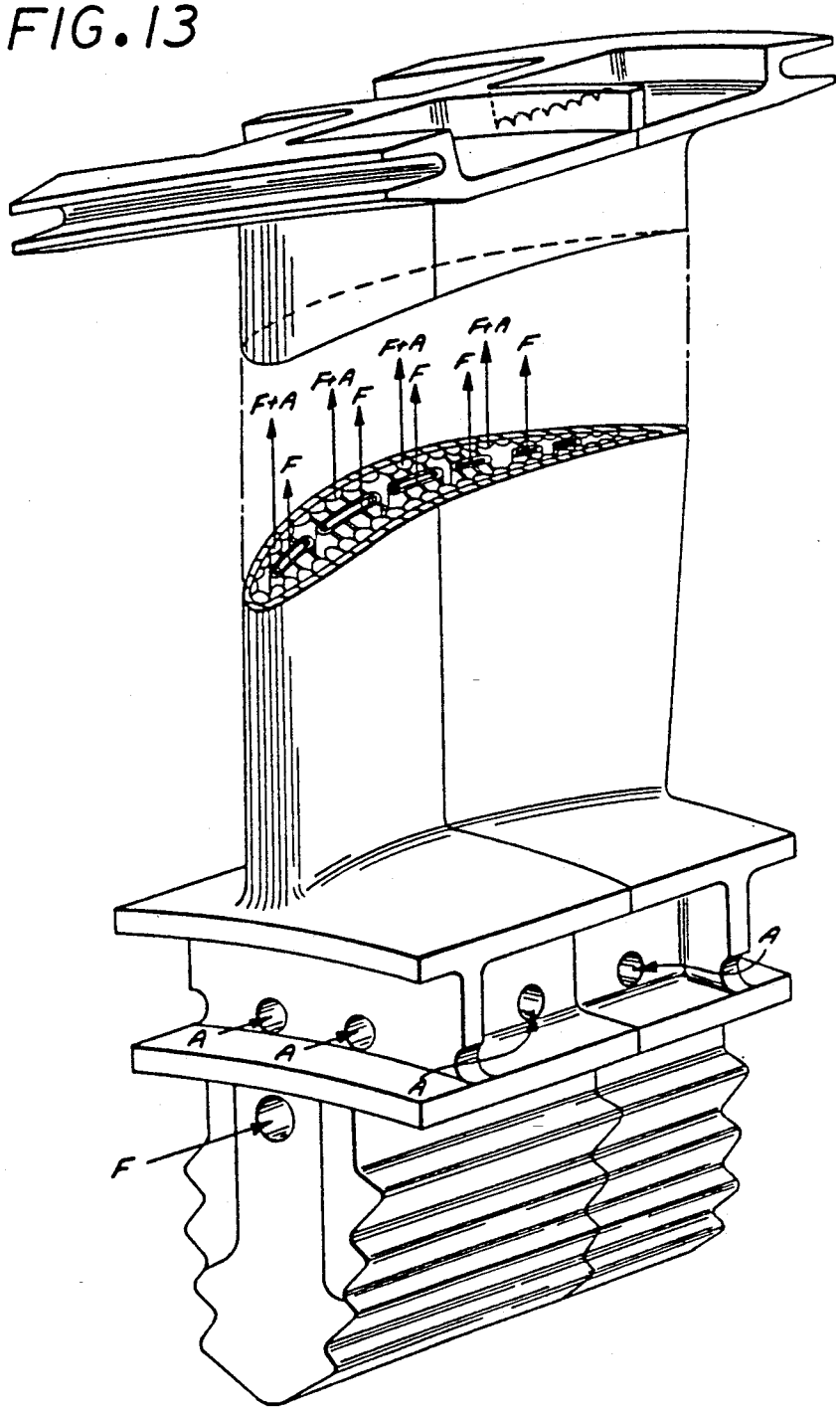
FIG. 13 is another sectional perspective view of the turbine blade of FIG. 12.

FIGS. 12 and 13 depict an alternative turbine blade structure, suitable for use in relatively large turbines. The blade includes an inner core 45, which provides the blade's structural strength, and an overlying skin 46. Liquid cooling channels 45.1 are formed in the interior of the inner core, and air cooling channels 46.1 are formed as channels in the outside surface of the core. Calibrated transverse passageways or orifices 45.2 interconnect the respective liquid and air channels, such that the injected liquid is sprayed against the hot inner surface of the skin 46. The skin is thus in direct contact with the hot combustion gases on its outer surface and with the cooling liquid and air on its inner surface. Forming the skin of a thin metallic material with high heat resistance minimizes the heat stress it experiences. The turbulent mix of liquid and air provides extremely high heat absorption from the blade skin.

Figure 14:
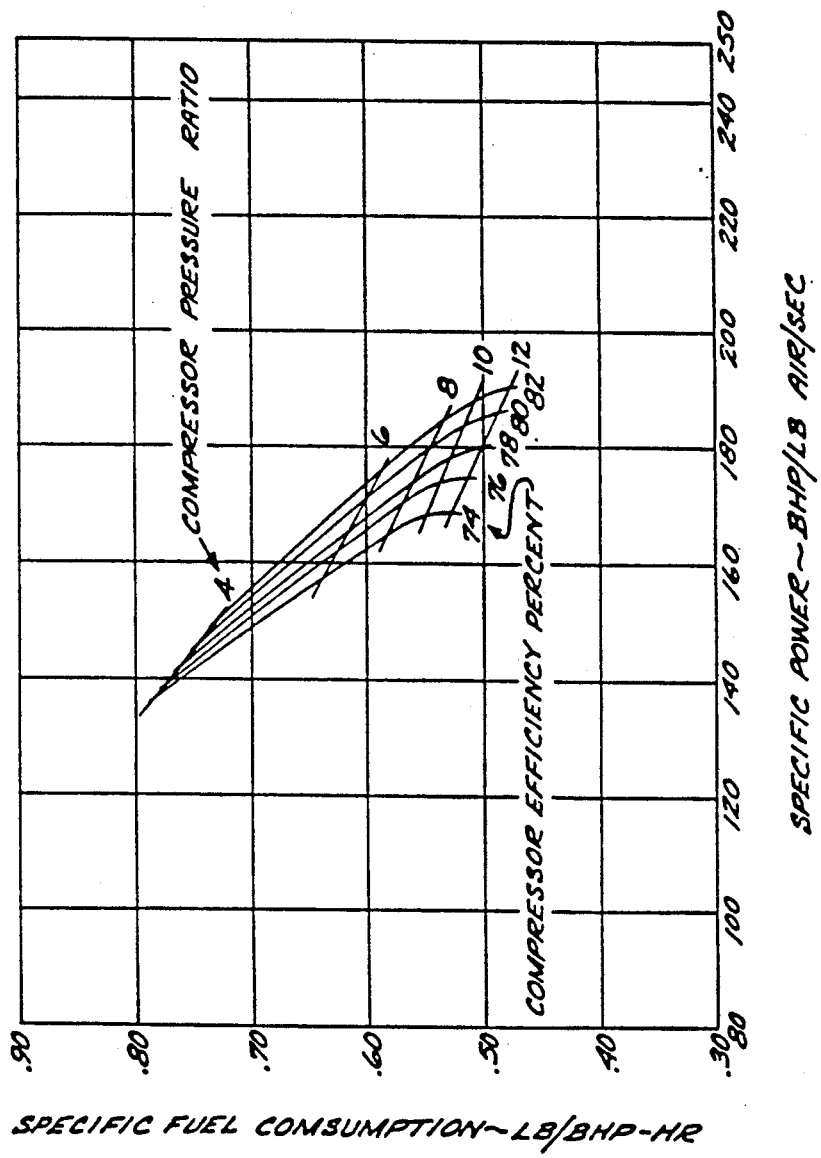
FIG. 14 is a graph showing the relationship between compressor pressure ratio and overall engine performance.
Figure 15:
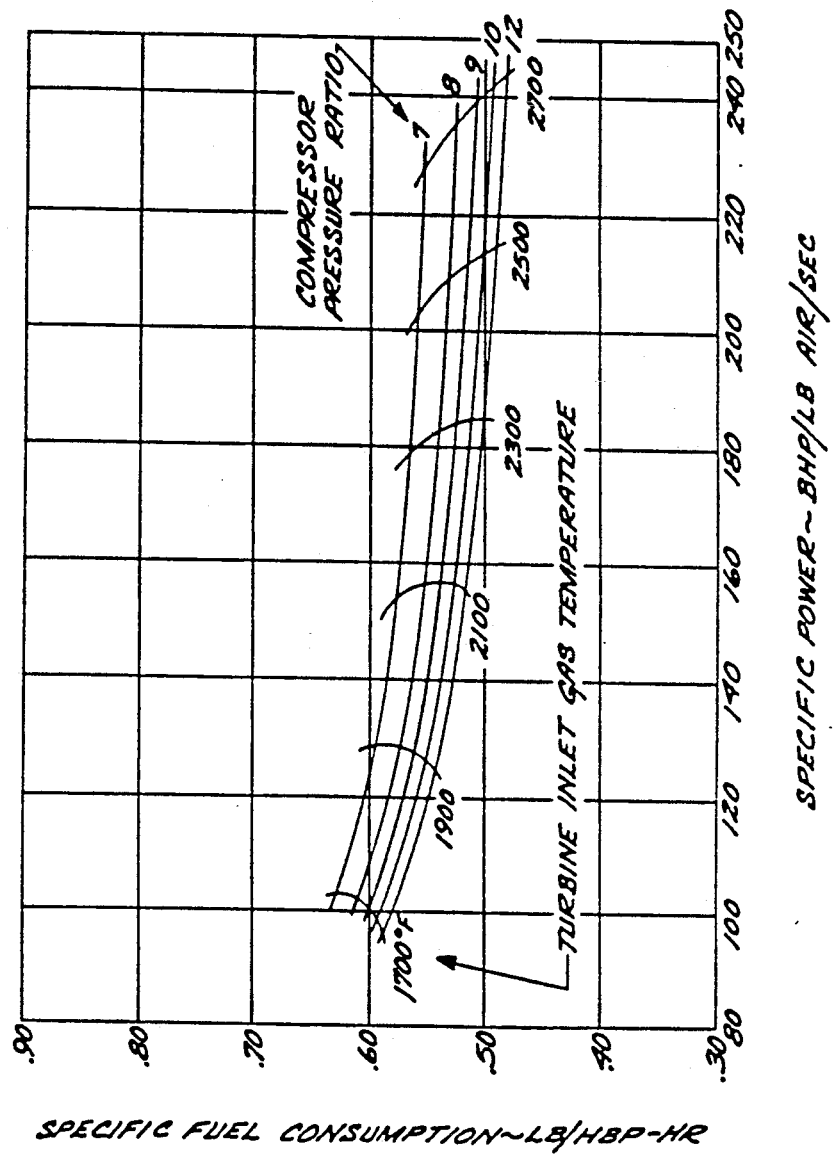
FIG. 15 is a graph showing the relationship between turbine inlet temperature and power output per point of air flow.
Figure 16:
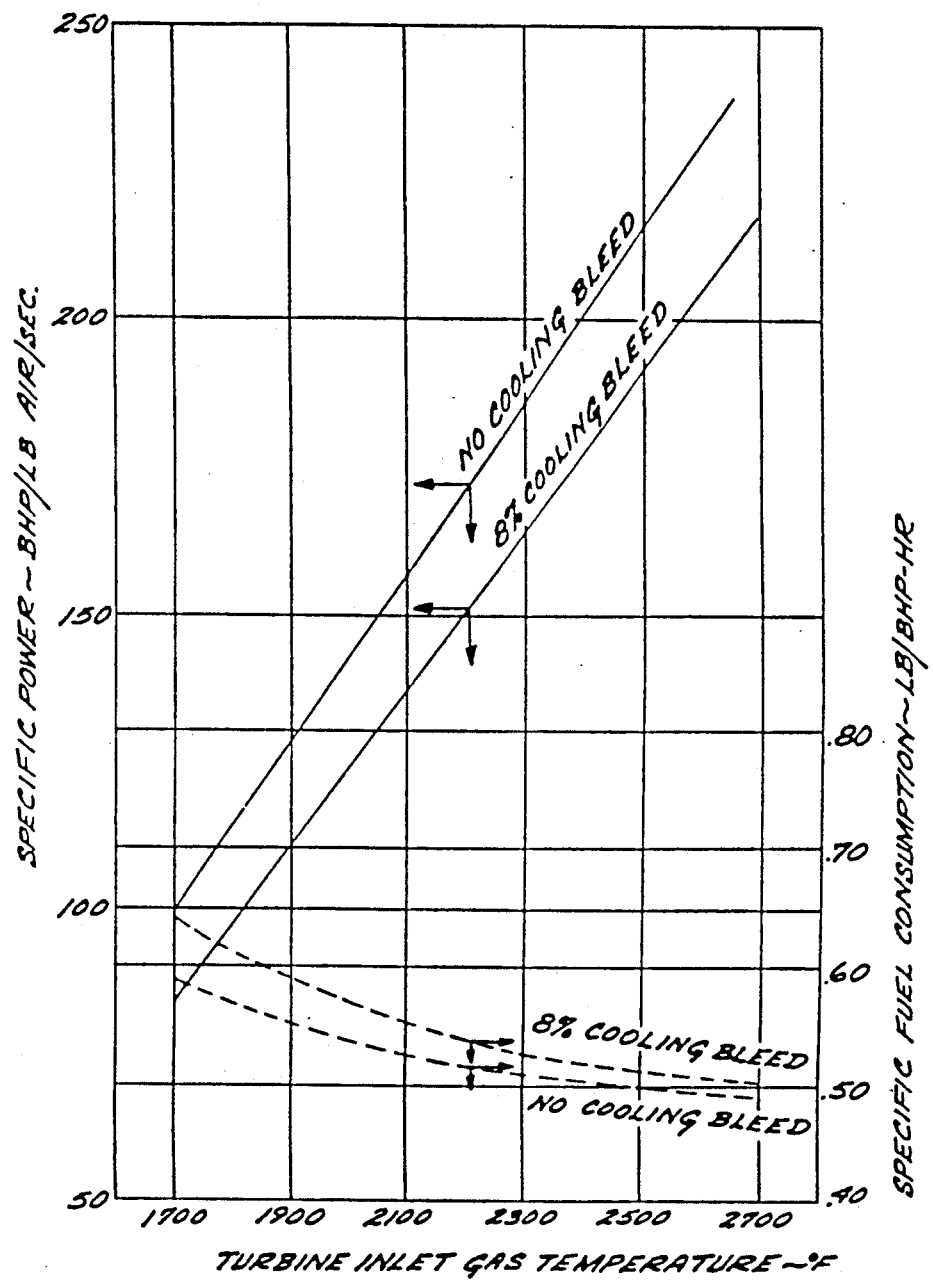
FIG. 16 is a graph showing the drop in engine efficiency caused by diverting air to cool the turbine shrouding, stator blades and rotor blades.

Referring to FIGS. 14–16 the various factors affecting engine performance are graphically illustrated. FIG. 14 shows the effect of turbine inlet gas temperature on engine cycle performance. FIG. 16 shows the effect of cooling bleed on engine cycle performance.

It should be appreciated from the foregoing description that the present invention provides a gas turbine engine that can operate at a very high efficiency over a wide range of load conditions. In one important feature of the invention, combustion gases are discharged along two paths, one with constant energy and the other with energy that varies in accordance with the engine load. The constant energy discharge drives a turbine at a constant speed that, in turn, operates a compressor at a constant, high efficiency. Alternatively, the compressor can be driven at a controllably-variable speed, such that it provides a pressure ratio that varies inversely with engine load. In this case, the engine operates at a high efficiency for all loads. In another, independent feature of the invention, the combustion can occur at a stoichiometric ratio of fuel and air, with the turbine blades being protected from the vastly increased combustion gas temperatures by an internal array of passageways through which cooling liquid, e.g., liquid fuel, and air are channeled. The fuel and air mix together to form a rich, turbulent pre-mix for ejection directly into the surrounding combustion chamber. In yet another independent aspect of the invention, the compressor that supplies compressed air to the combustion chamber includes two counter-rotating radial impellers, with the second impeller further functioning as a diffuser for the first impeller.

It should also be appreciated from the foregoing description that other embodiments provide an efficient cogeneration process that produces steam internally, within the turbine and stator blades and within the combustion chamber, rather than externally. This provides an enormous reduction in the size, weight and cost of the engine. In addition, the isothermal compression feature, as well as partial isothermal re-heating or expansion feature, provide improved maximum power levels and efficiency. Further, all of the embodiments provide reduced specific fuel consumption, at all loads, making practical the use of the engine in numerous variable-load applications, heretofore not practical for gas turbine engines.

Although the invention has been described in detail with reference to the presently-preferred embodiments, it will be understood by those of ordinary skill in the art that various modifications can be made without departing from the invention. Accordingly, the invention is defined only by the following claims.

What is claimed is:

1. A gas turbine engine comprising:
   means defining a combustion chamber in which fuel and air are mixed together and burned to produce combustion gases;
   a turbine rotatably driven by the combustion gases produced in the combustion chamber, the turbine including a plurality of blades spaced uniformly around its periphery, each blade including a narrow passageway in its interior, terminating in an outlet port; and
   injection means for injecting both cooling liquid and cooling air into the narrow passageway in each turbine blade, producing a turbulent mix of liquid and air in the passageway that enhances the absorption of heat from the blade by the liquid and air, the heated mix of liquid and air thereafter being ejected through the outlet port, wherein:
   the outlet port for the narrow passageway in each turbine blade is located at the remote tip of the blade, such that the turbulent mix of liquid and air is ejected directly from the remote tip of the blade;
   each turbine blade includes at least two narrow passageways, the injection means injecting cooling liquid into a first passageway and cooling air into a second passageway; and
   each turbine blade further includes a plurality of lateral passageways interconnecting the first and second passageways, the cooling liquid injected into the first passageway passing through the lateral passageways into the second passageway, where it is mixed with the injected air and thereafter ejected with the air through the outlet port.

2. A gas turbine engine as defined in claim 1, wherein the cooling liquid moves through the narrow passageway in each turbine blade substantially under the influence of centrifugal force.

3. A gas turbine engine as defined in claim 1, and further including a compressor rotatably driven by the turbine, for compressing air and directing it to the injection means for injection into the narrow passageway in each turbine blade.

4. A gas turbine engine as defined in claim 1, wherein each turbine blade includes a core having the passageways formed therein and a thin skin secured to and enclosing the core, the core providing substantially all of the blade's structural strength.

5. A gas turbine engine as defined in claim 4, wherein each turbine blade includes:
   a plurality of radially-aligned first passageways into which the injection means injects cooling liquid;
   a plurality of radially-aligned second passageways into which the injection means injects cooling air, the second passageways being in the form of channels in the outer surface of the blade core, surrounding the first passageways; and
   a plurality of lateral passageways interconnecting each first passageway with a plurality of associated second passageways.

6. A gas turbine engine as defined in claim 4, wherein:
   the turbine further includes a central disk to which the plurality of blades are secured; and
   the core and the thin skin of each turbine blade include fir-tree segments for use in securing them to each other and to the turbine disk.

7. A gas turbine engine as defined in claim 1, wherein:
   each turbine blade includes an inner tube and a thin skin secured to and enclosing the inner tube;
   the first passageway, into which the injection means injects cooling liquid, is located inside the inner tube;
   the second passageway, into which the injection means injects cooling air, is located in the space between the inner tube and the skin; and
   the lateral passageways include ports in the inner tube, such that cooling liquid is sprayed through the ports onto the inwardly-facing surface of the skin.

8. A gas turbine engine as defined in claim 7, wherein each turbine blade is:
   formed of two blade halves, each including half of the inner tube and half of the thin skin, the inside surface of the inner tube half being fully exposed in each blade half; and
   drilled ports in the exposed surface of the inner tube in each blade half wherein
   the two blade halves are welded together.

9. A gas turbine engine as defined in claim 1, wherein the cooling liquid injected by the injection means includes both water and liquid fuel, such that a turbulent mix of high-speed, superheated water vapor, fuel vapor and air is ejected from the remote tip of the blade, the water vapor diluting the combustion gases, thus lowering its temperature, and also providing a Rankine cycle, by internal cogeneration.

10. A gas turbine engine as defined in claim 9, wherein the injection means further includes means for controllably adjusting the relative amounts of liquid fuel and water injected into the narrow turbine passageways.

11. A gas turbine engine as defined in claim 1, wherein:
the engine further includes a stator having a plurality of fixed vanes located in front of the turbine, in the path of the combustion gases, each vane being associated with a separate turbine blade;
each stator vane includes a narrow passageway in its interior, terminating in an outlet port; and
the injection means further injects both cooling liquid and cooling air into the narrow passageway in each stator vane, producing a turbulent mix of liquid and air that enhances the absorption of heat from the vane by the liquid and air.

12. A gas turbine engine as defined in claim 1, and further including control means for conditioning the injection means to controllably vary the relative proportions of cooling liquid and cooling air it injects into each turbine blade.

13. A gas turbine engine as defined in claim 12, wherein the control means conditions the injection means to inject only cooling air when the engine is operating at a relatively low power level.

14. A gas turbine engine as defined in claim 1 wherein the combustion chamber is annular and configured to encircle the turbine, with the remote tips of the turbine blades disposed in direct communication with the combustion chamber.

* * * * *